United States Patent [19]
Ravier

[11] Patent Number: 5,657,915
[45] Date of Patent: Aug. 19, 1997

[54] MULTIPURPOSE OBJECT HOLDER DEVICE FOR VEHICLES, IN PARTICULAR FOR TRANSPORTING SKIS, SURFBOARDS OR LIKE ARTICLES

[75] Inventor: Jean-Marie Ravier, Saint Malo, France

[73] Assignee: Automaxi Industries, Saint Malo, France

[21] Appl. No.: 373,039

[22] Filed: Jan. 17, 1995

[30] Foreign Application Priority Data

Jan. 21, 1994 [FR] France ................... 94 00647

[51] Int. Cl.⁶ .................. B60R 9/00; B60R 9/048
[52] U.S. Cl. .................. 224/324; 224/315; 224/319; 224/917.5
[58] Field of Search .......... 224/315, 318–324, 224/329–331, 917, 917.5; 211/70.5; 280/814; 296/37.7

[56] References Cited

U.S. PATENT DOCUMENTS

| | | | |
|---|---|---|---|
| 3,378,182 | 4/1968 | McMiller | 224/29 |
| 3,610,491 | 10/1971 | Bott | 224/29 |
| 3,726,410 | 4/1973 | Binding et al. | 280/814 |
| 4,143,799 | 3/1979 | Dietlein et al. | 224/301 |
| 5,115,955 | 5/1992 | Dallaire et al. | 224/324 |

*Primary Examiner*—Henry J. Recla
*Assistant Examiner*—Timothy L. Maust
*Attorney, Agent, or Firm*—Bachman & LaPointe, P.C.

[57] ABSTRACT

In a multipurpose object holder for skis, surfboards or the like an elastic device including a horizontal plate and two curved lateral tongues is inserted in a vertical guide fastened to a base. The radius of curvature of one tongue is greater than that of the other tongue, allowing for the definition of lateral transport compartments of different thickness. A further elastic tongue is attached to a mobile clamp. The objects to be transported can also be placed between the plate and the further elastic tongue. In a second version of the object holder the elastic device is fastened to a mobile clamp and has an X-shape cross-section that includes two V-shape lateral reinforcing members such that two ranges of pressure forces are defined.

8 Claims, 6 Drawing Sheets

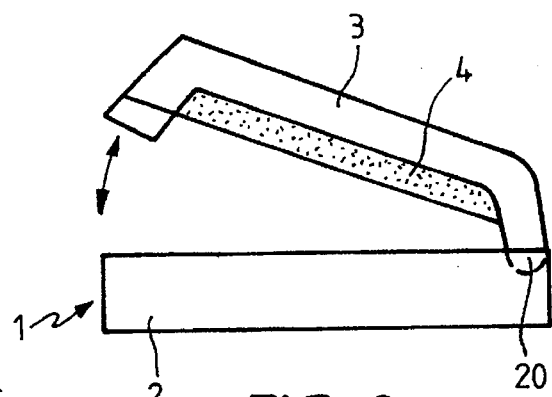
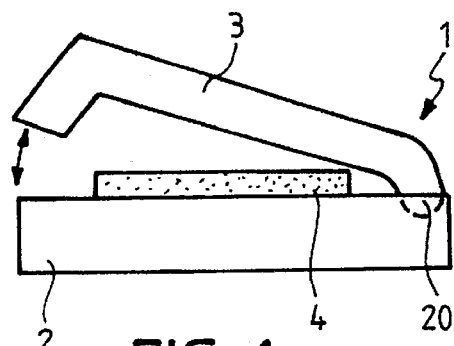
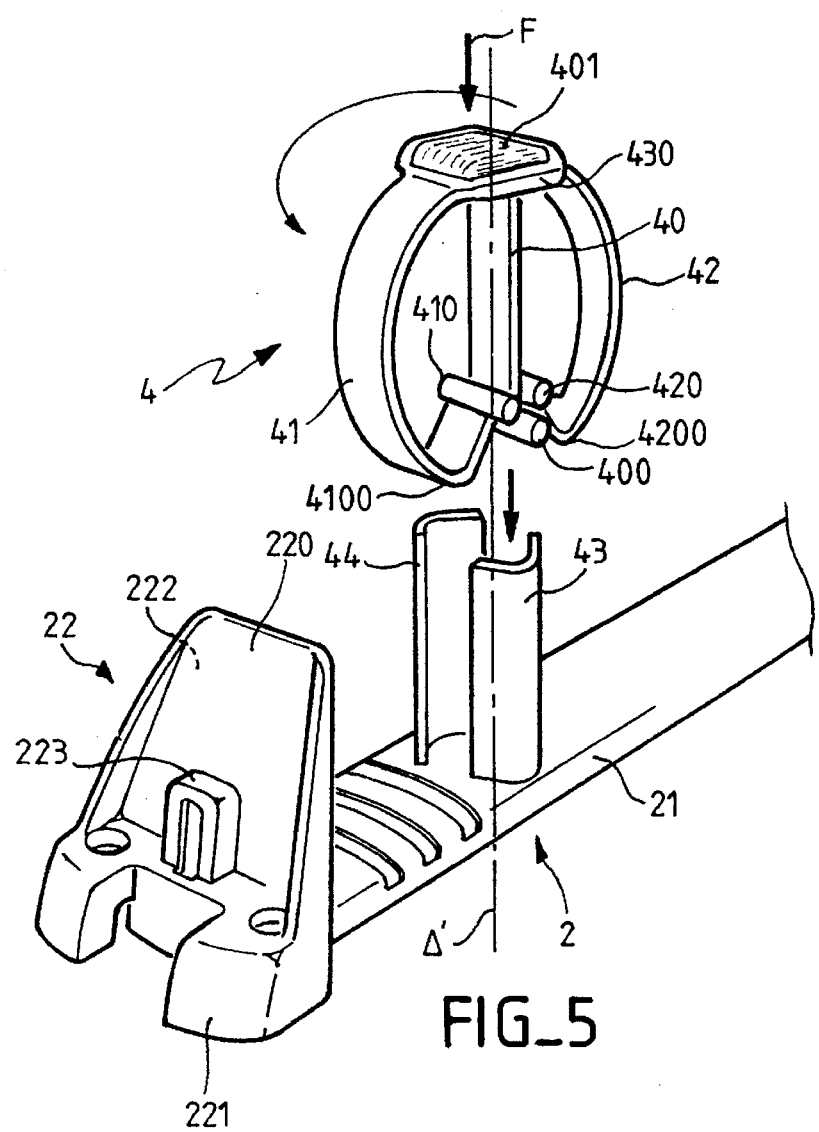

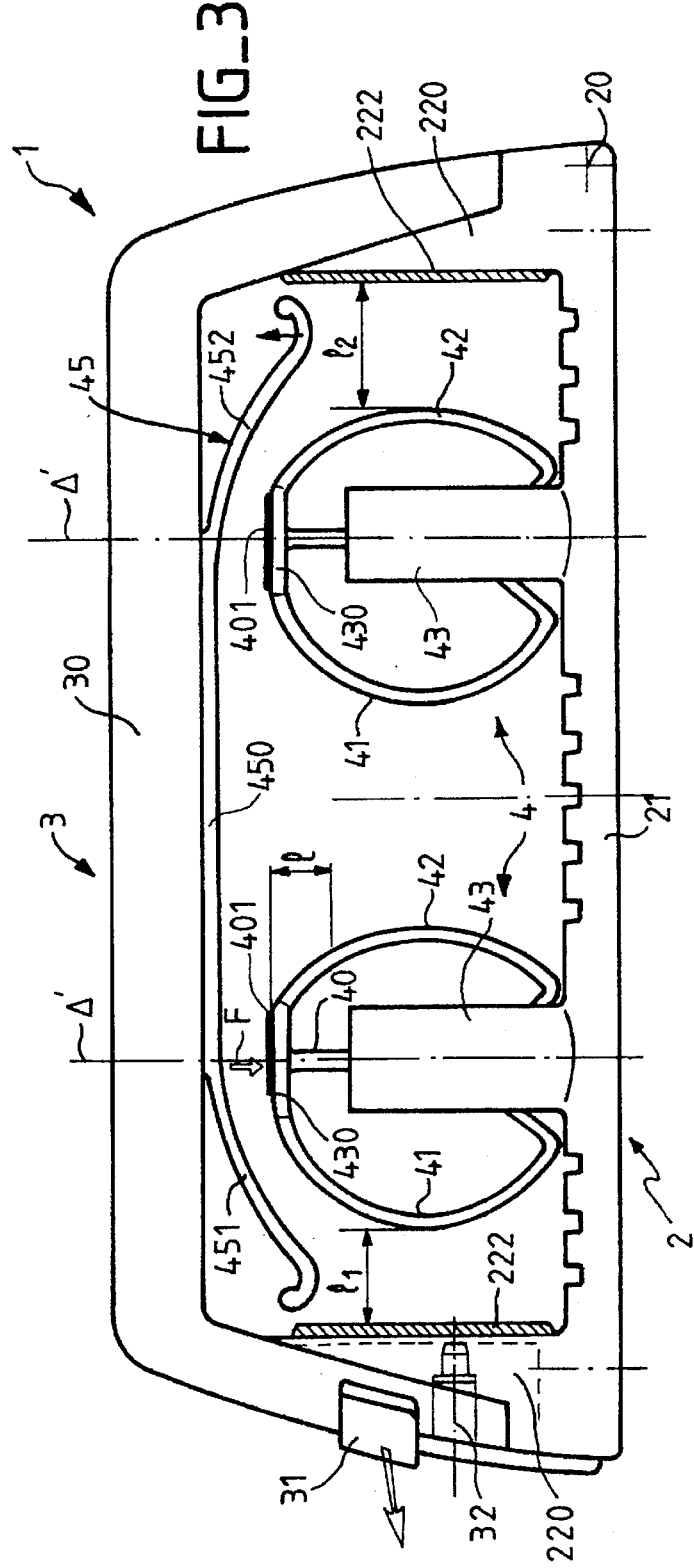
FIG_3
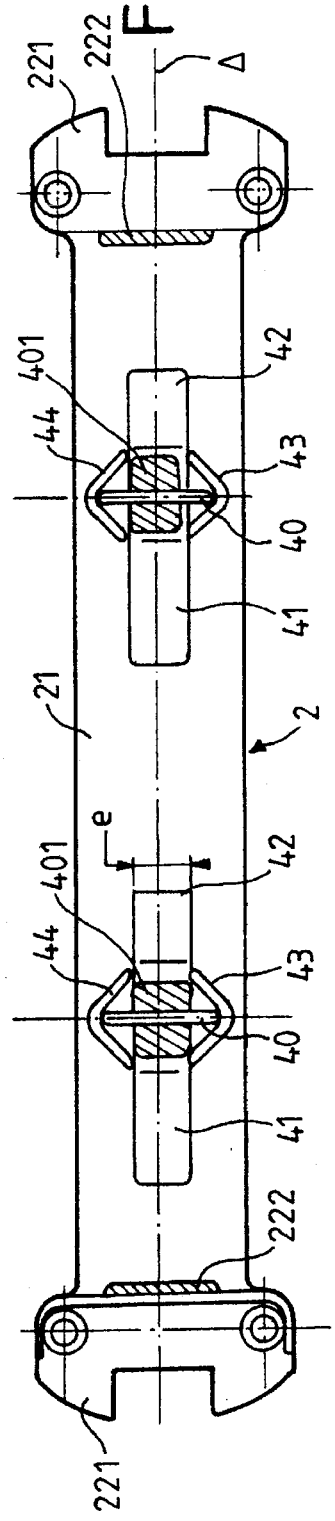
FIG_4

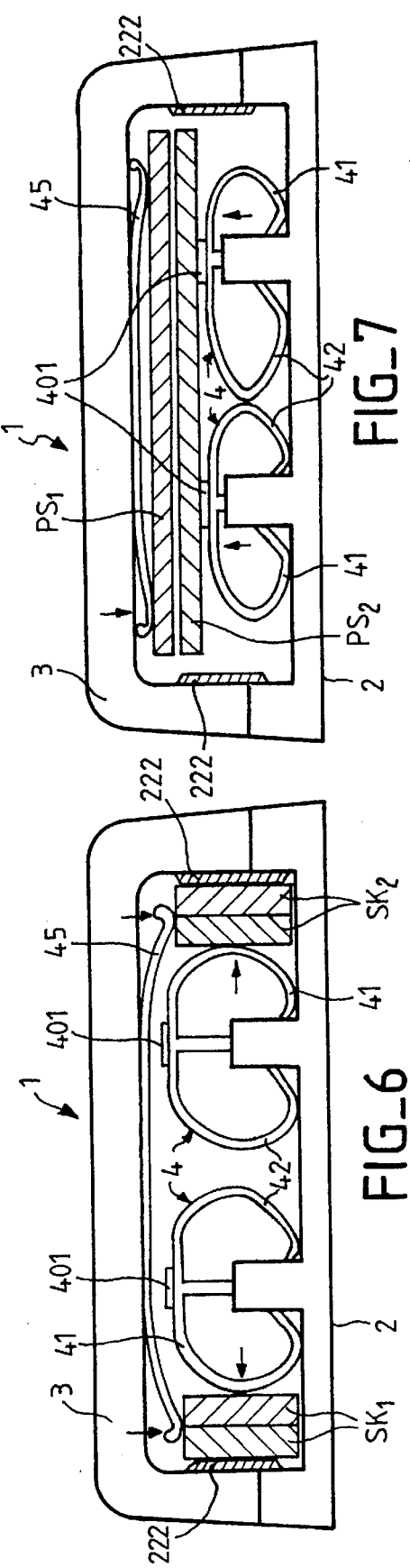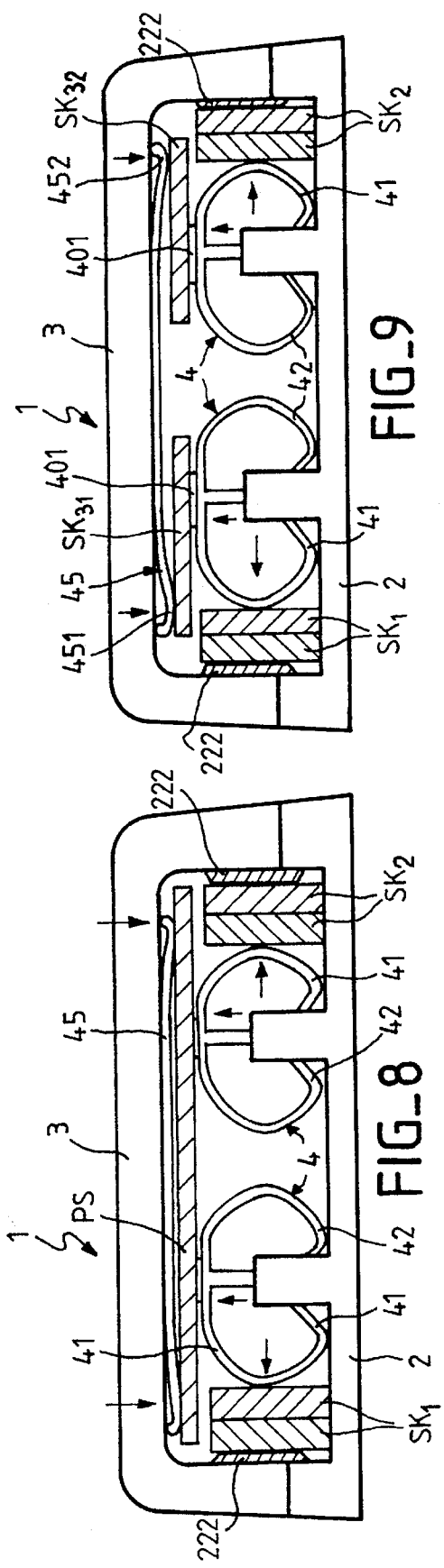

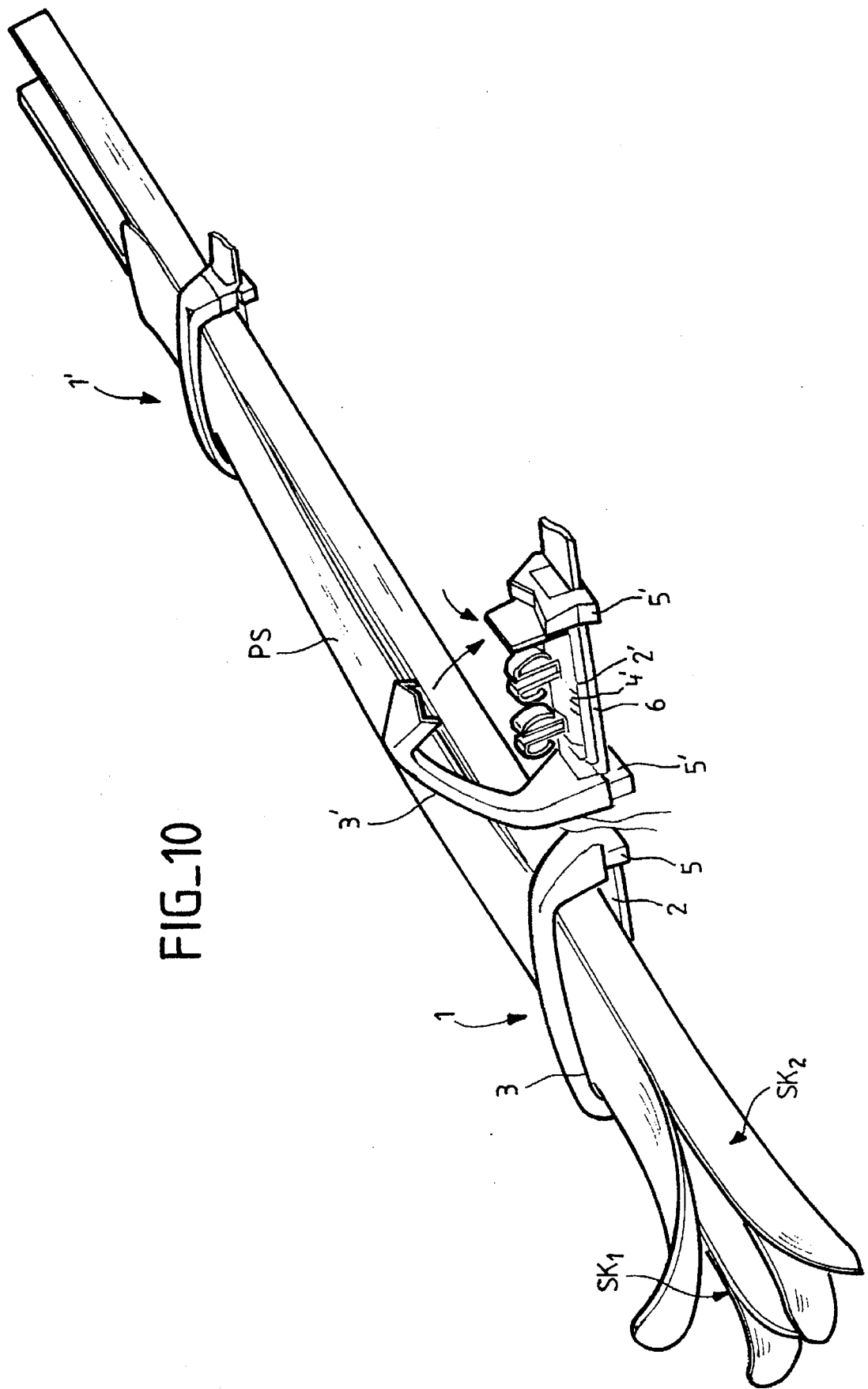
FIG_10

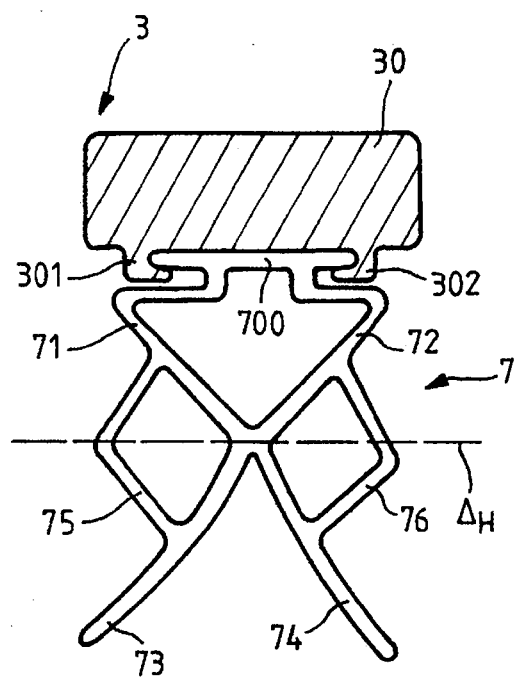
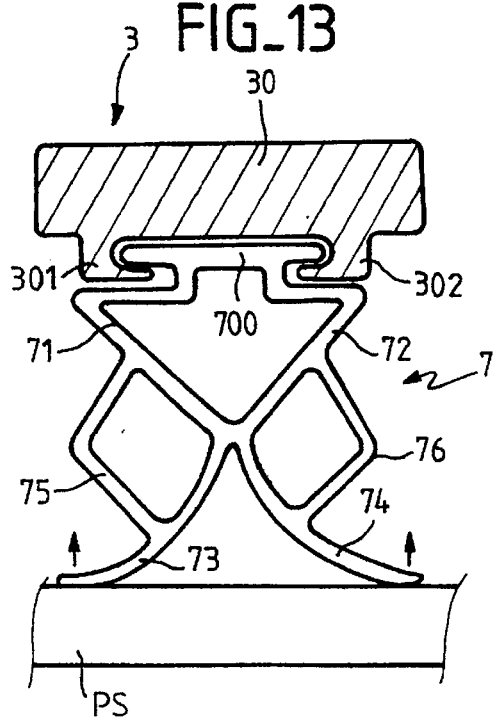
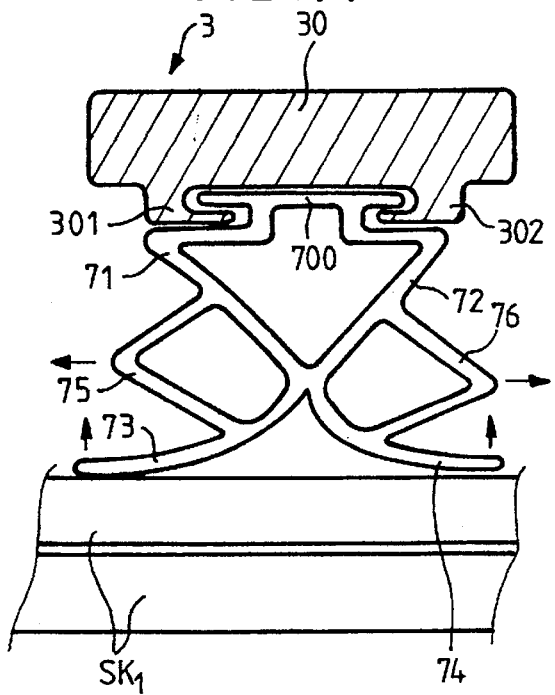

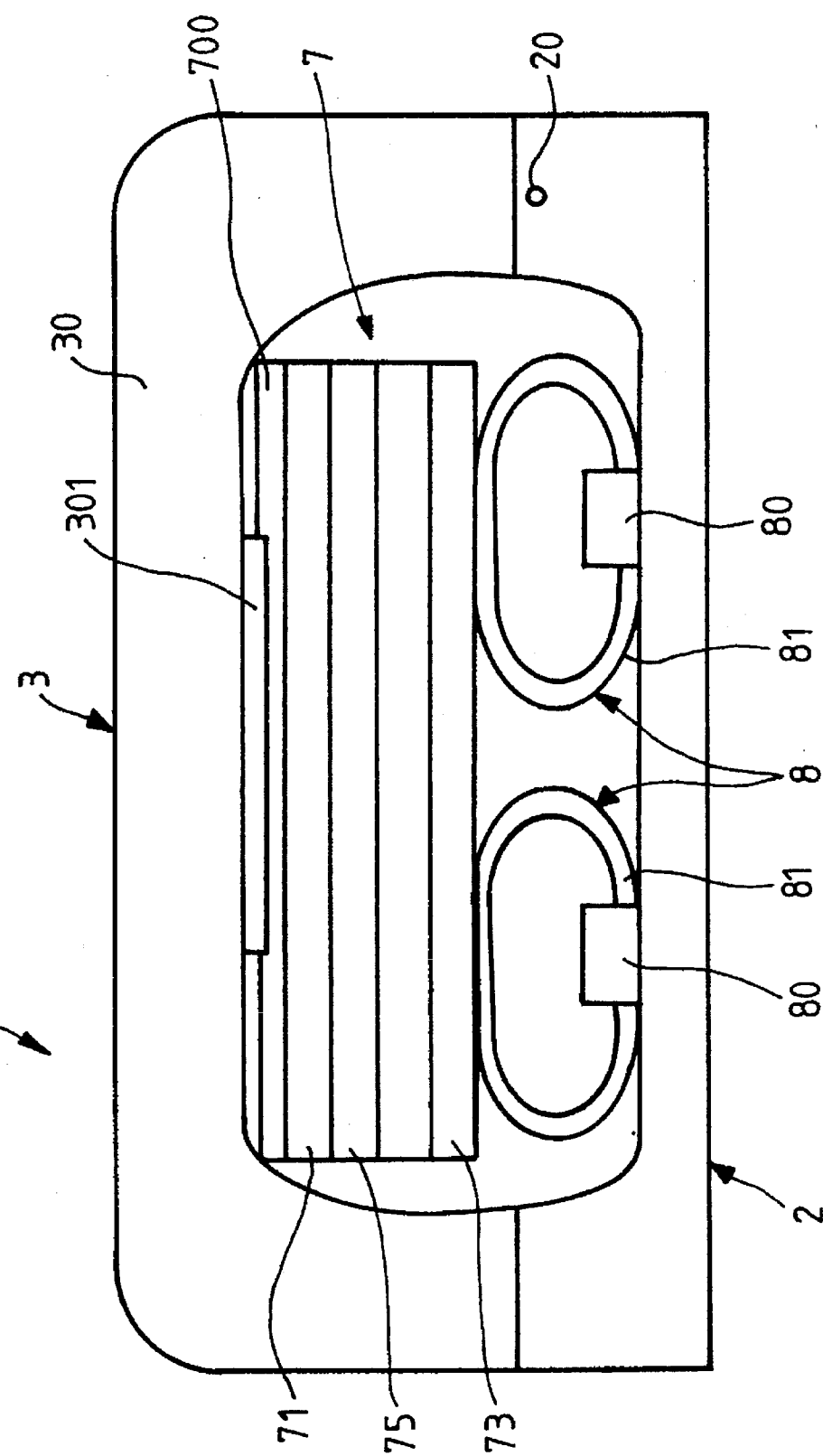

MULTIPURPOSE OBJECT HOLDER DEVICE FOR VEHICLES, IN PARTICULAR FOR TRANSPORTING SKIS, SURFBOARDS OR LIKE ARTICLES

BACKGROUND OF THE INVENTION

1. Field of the Invention

The invention concerns a multipurpose object holding device, more particularly a device for transporting skis, surfboards, monoskis or other similar articles and adapted to be attached to or forming an integral part of roofrack bars of a vehicle.

In the context of the present invention, by "roof" is meant the actual roof of a vehicle and any are to which such bars can be attached. This can mean, for example, the top of the trunk of an automobile vehicle or the back of a van type vehicle.

2. Description of the Prior Art

There has been a substantial increase in the need for dedicated transport devices given the upsurge in skiing, surfing and like sports, whether on snow or on water. Many such devices are available. They are usually either dedicated roofrack bars for transporting skis and incorporating dedicated elements including fixed members or "carry all" bars to which is fixed a device incorporating dedicated members and fixing clamps.

The transportation of this type of article causes specific problems:

It is usually necessary to transport more than one such article at a time.

Articles in the same category (e.g. skis) are available in various sizes: skis for children, skis for adults, and skis of various types: skis for downhill skiing, skis for cross-country skiing having very different characteristics.

Finally, recent years have seen the introduction of various other devices for skiing, surfing and like sports, including surfboards and monoskis.

Prior art transport devices essentially comprise a support or base and a clamp that pivots or is demountable combined with elastic means for exerting a holding pressure. These devices usually have an open (unlocked) position for inserting the ski or skis or other articles between the base and the support and a locked position in which the article is held firmly between the clamp and the base by the elastic holding means.

Although the prior art devices are well designed for the transportation of one category of sporting articles and in some cases for the simultaneous transportation of several articles of the same category, it is necessary to use dedicated members for the transportation of articles of different categories, and the prior art devices are at best ill-suited to this type of use.

A main object of the invention is a multipurpose object holder for vehicle roofrack bars enabling simultaneous transportation of a plurality of sporting articles of the same category such as skis, surfboards, monoskis and the like and/or the transportation of a plurality of sporting articles of the aforementioned types of different categories.

To this end the device of the invention includes, in a manner that is entirely similar to the prior art devices, a support or a base and a mobile clamp, and means for locking and unlocking this clamp, and elastic means for applying a holding force to the articles inserted between the clamp and the base.

However, in accordance with an essential feature of the invention, said elastic means are such that articles in different categories and/or of different thicknesses can be disposed inside the object holder of the invention, singly or in multiples.

To be more precise, there are two main embodiments of the device of the invention.

In the first embodiment the elastic means are fastened to the mobile clamp and in the second embodiment the elastic means are fastened to the base.

SUMMARY OF THE INVENTION

Accordingly, in one aspect the invention consists in an object holder device for transporting elongate objects such as skis, surfboards or similar articles, of the type comprising a base having an elongated inside surface which is substantially plane and parallel to a first direction and at least one wall orthogonal thereto, a clamp and elastic means disposed between the clamp and the base, the clamp and the base being able to assume at least two different relative positions, one of which is an unlocked position allowing insertion into said device of at least one object to be transported and the other of which is a locked position in which the elastic means immobilize said objects to be transported by exerting a holding force on them, the elastic means having at least first and second specific positions for holding objects to be transported, to allow the transportation of objects whose cumulative thickness are in first and second ranges of thickness, characterized in that it includes at least one elastic means supported by said base and in that said elastic means include a fixed part forming a guide fastened to the base and a mobile part including at least lateral members forming springs and guide means, the mobile part being inserted in said fixed part and the spring-forming lateral members allowing crushing by a specific amount of the mobile part in a direction substantially orthogonal to said first direction.

In a second aspect, the invention consists in an object holder device for transporting elongate objects such as skis, surfboards or similar articles, of the type comprising a base having an elongate inside surface which is substantially plane and parallel to a first direction and at least one wall orthogonal thereto, a clamp and elastic means disposed between the clamp and the base, the clamp and the base being able to assume at least two different relative positions, one of which is an unlocked position allowing the insertion into said device of at least one object to be transported and the other of which is a locked position in which the elastic means immobilize said objects to be transported by exerting a holding force on them, the elastic means having at least first and second specific positions for holding objects to be transported to enable the transportation of objects whose cumulative thicknesses are in first and second ranges of thickness, characterized in that it includes at least one elastic means fastened to the clamp and in that said means comprise a plate attached to the clamp, a substantially X-shape member made from a material having elastic properties with the ends of the upper arms attached to said plate and the ends of the lower arms being free, and lateral reinforcing members of said X-shape first member, said lateral reinforcing members being also made from a material having elastic properties so as to exert on the objects to be transported a holding force in a first range when the cumulative thicknesses, said holding force being due to flexing of the lower arms of the X-shape member, and to exert on the objects to be transported a holding force in a second range when the cumulative thicknesses of the latter are in a second range of thicknesses, said holding force being due to deformation of the X-shape member and of the lateral reinforcing members.

3

The invention will be more clearly understood and other features and advantages of the invention will emerge from a reading of the following description given with reference to the appended figures.

BRIEF DESCRIPTION OF THE DRAWINGS

FIGS. 1 and 2 are schematic illustrations of the two main embodiments of the object holder device of the invention.

FIGS. 3 and 4 show a first variant of the device of the invention as seen from the side and from the top.

FIG. 5 shows part of this same variant in perspective.

FIGS. 6 through 9 show various options for transportation of skis, surfboards or other like articles.

FIG. 10 is a perspective view showing the fixing of devices of the invention to the roofrack bars of a vehicle.

FIGS. 11 through 14 show a second embodiment of device of the invention.

DETAILED DESCRIPTION OF THE PREFERRED EMBODIMENTS

FIG. 1 shows a first embodiment of the object holder device of the invention, which is called a ski rack in the remainder of this description as this is its usual name. However, it is to be understood that this name must be interpreted in a broad sense to include in particular the transportation of surfboards and monoskis. In this embodiment of the invention the elastic holding means 4, described in more detail below, are attached to the base or support 2 of the ski rack device 1. The device also includes a mobile clamp 3. In the example shown the clamp 3 rotates about a spindle 20 which is an integral part of the base of support 2. The object to be transported (not shown) is inserted in the conventional way between the clamp 3 and the support 2 with the device 1 in its unlocked position. The clamp 3 is then closed (as shown by the arrow in FIG. 1) and locked to the support 2 using any prior art means: bolt, catch, etc. The elastic means then exert a holding force on the object or objects to be transported. Because of the specific configuration of the elastic means 4 of the invention, the holding force adapts automatically to the number and to the nature of the objects to be transported.

FIG. 2 is a schematic view of a second embodiment of device of the invention. In this case the elastic means are attached to the mobile clamp 3.

FIGS. 3 through 5 show in more detail one example of object holder device in accordance with the first embodiment of the invention.

In these figures and the later figures parts which are identical or at least similar carry the same references and are described again only as and where needed.

These figures show a single ski rack element. Evidently at least two of these are usually needed, disposed one at the front and the other at the rear of the roof of an automobile or other vehicle, for example, and each associated with a roofrack bar (not shown in the figures). Each bas is usually provided with one or more such elements.

The base 2 of the object holder 1 has a horizontal part 21 which is substantially parallelepiped shape, two lateral parts comprising vertical walls 220 and conventional members 221 for fixing it to a roofrack bar (not shown). The inside lateral walls 220 advantageously carry retaining plates 222 covering all or part of these walls. These are usually pieces of rubber or a similar material with striations or other patterns appropriate to this use.

4

The ski rack device also includes a mobile clamp 3 which rotates about a spindle 20 in the example shown. The clamp 3 can be detachable without this departing from the scope of the invention.

It has an inverted U-shape curved part 30. A clipping member 31 is usually provided on one wall and cooperates with a like member 223 on the base 2 (FIG. 5). A lock 32 operated by a key can also be provided with advantage.

These items are shared with the prior art and there is no need to describe them further.

On the other hand, the elastic means 4 have a configuration which is specific to the invention.

They essentially have two parts, a fixed part and a mobile part.

The fixed pard is attached to the base 21. In the example shown it has two vertical walls 43 and 44 with an open V-shape, the points of the V-shape pointing outwards. These two walls define an open enclosure leaving a free passage along the lengthwise axis $\Delta$ of the device 1.

The mobile part comprises two lateral pressure members 41 and 42 each comprising a curved tongue forming a leaf spring and a central tongue 40. The upper end of these tongues is fixed to a horizontal plate 430. The latter is advantageously provided with a pad 401 similar to the retaining plates 222. The lower ends of the tongues are provided with strengthening members, for example tubular members 400, 410 and 420. The tongue are made from an elastic material, preferably from a plastics material. The width of the tongues 40, 41 and 42 is less then the gap (free passage) between the vertical walls 43 and 44. This width "e" can advantageously be the same for all three tongues, or at least for the lateral tongues 41 and 42. On the other hand, the length of the reinforcements at the end is greater than "e" but less than the distance between the inside surfaces of the two lateral walls (the bottoms of the V-shape). Accordingly, these strengthening members can be inserted into the space defined by the two lateral walls 43 and 44 and serve as guides. Finally, the length of the vertical tongue 40 is such that once the mobile part of the elastic means 4 has been inserted between the vertical walls 43 and 44 it rests on the curved lower parts 4100 and 4200 of the lateral tongues 41 and 42. This arrangement enables depression of the central tongue 40 when a downward force (F) is applied to the plate 430. The central vertical tongue is depressed until the strengthening member 400 bears on the upper surface of the base 21, this enabling downward movement of the plate with a maximal amplitude 1.

As already mentioned, the tongues or at least the lateral tongues 41 and 42 are made from a material having elastic properties. The compression force F increases the curvature of the tongues. In other words, the central area of the tongues 41 and 42, that between the plate 430 and the bearing areas 4100 and 4200, moves away from the vertical axis $\Delta'$ coincident with the central tongue 40. When the force F is removed, the resilience of the tongues returns them to their original position.

The force F is produced when a ski, a surfboard or any other similar article, or several such articles, is or are inserted between the clamp 3 and the plate 430.

In a preferred embodiment of the invention, further elastic means 45 in the form of an elongate tongue are advantageously added. This tongue has a plane central area 450 and two curved branches 451 and 452 which also form leaf springs. The latter are disposed over an area substantially covering the tongue 41 of the elastic means shown on the lefthand side of FIG. 3 in the case of the branch 451 and the tongue 42 of the elastic means shown on the righthand side of FIG. 3 in the case of the branch 452. The tongue 45 is advantageously made from the same material as the tongues 41 and 42. The fixing means can comprise a groove in which the tongue 45 is engaged or any other known fixing means, such as screw fasteners, etc.

In a preferred embodiment of the device of the invention one of the lateral tongues, the tongue 41 in the example shown, has a larger radius of curvature than the other tongue, the tongue 42 in this example. It follows that the distances $l_1$ and $l_2$ that separate the outside wall of these tongues from the retaining plates 222 disposed on the inside surface of the walls 220 are different from the tongue 41 and the tongue 42. This means that skis of very different thicknesses can be inserted between the elastic tongues 41 or 42 and the retaining plates 222, for example skis for downhill skiing or skis for cross-country skiing.

As the assembly comprising the tongues 40–42 and the plate 430 is removable, to insert one or other of these ski types all that is required is to extract this assembly from its housing (fixed walls 43 and 44), rotates it 180° about the axis $\Delta'$ (see FIG. 5), and re-insert it between the walls 43 and 44. The tongue 42 which was to the right of the axis $\Delta'$ is then to the left of this axis. The distance between the plate 222 and the lefthand tongue (now the tongue 42) is greater than previously, since $l_1 < l_2$. A simple operation is therefore sufficient to adapt the device for transportation of two very different types of skis.

FIGS. 6 through 9 show various options offered by the ski rack device in the embodiment just described. These uses are by no means exhaustive.

FIG. 6 shows the possibility of simultaneous transportation of two pairs of skis $SK_1$ and $SK_2$ for downhill and/or cross-country skiing, according to the positioning of the elastic means in their housings, as just described. The skis $SK_1$ and $SK_2$ are shown in cross-section at the ski rack 1 for reasons of simplicity. In this example of application only the lateral tongues 41 of the elastic means 4, which are in contact with the wall of the skis, exert any holding force on the latter. The skis $SK_1$ and $SK_2$ are positioned vertically between the elastic means 4 and the retaining plates 222.

FIG. 7 shows the possibility of simultaneous transportation of two surfboards $PS_1$ and $PS_2$. The latter are disposed horizontally between the retaining plates 401 and the clamp 3 or, to be more precise, between the retaining plates 401 and the auxiliary elastic tongue 45, if the latter element is present. In this application the lateral tongues are crushed and exert a vertical holding force on the surfboards $PS_1$ and $PS_2$.

FIG. 8 shows the possibility of simultaneous transportation of two pairs of skis $SK_1$ and $SK_2$ for downhill and/or cross-country skiing and a surfboard PS. The tongues of the elastic means exert lateral holding forces on the skis $SK_1$ and $SK_2$ and, due to their being crushed, vertical forces acting via the plates 430 on the surfboard PS. The elastic tongue 45 also exerts a vertical holding force on the surfboard PS.

Finally, FIG. 9 shows the possibility of simultaneous transportation of three pairs of skis $SK_1$, $SK_2$, $SK_{31}$ and $SK_{32}$ for downhill and/or cross-country skiing. The ski $SK_{31}$ of the third pair is disposed between the plate 401 of the elastic means (see the lefthand part of FIG. 9) and the branch 451 of the elastic tongue 45; the ski $SK_{32}$ of the same pair of skis is disposed between the plate 401 of the elastic means (see the righthand side of FIG. 9) and the branch 452 of the elastic tongue 45. The forces in play are similar to those for the application shown in FIG. 8. In particular, each branch 451 and 452 of the elastic tongue 45 exerts a vertical holding force on a respective ski $SK_{31}$ and $SK_{32}$ of the third pair.

FIG. 10 is a perspective view showing the possibility of transporting two pairs of skis and a surfboard PS as described with reference to FIG. 8. This example assumes that two pairs of ski racks are mounted on two roofrack bars of a vehicle (not shown). To simplify the figure only three ski rack devices are shown: two at the front (1 and 1') and one at the rear. Also, to illustrate the invention more completely, the device 1 is shown in the locked position, i.e. with the clamp 3 enclosing the skis $SK_{31}$ and $SK_{32}$ and the surfboard PS to be transported. The device 1' is shown in the unlocked position with the clamp 3' open. FIG. 10 shows the elastic means 4' disposed on the base 2'.

Finally, in the conventional manner, the ski rack devices are attached to roofrack bars by means of clamps: in the example shown clamps 5 and 5' fit around the roofrack bar 6.

It is advantageous for the end of the clamps 3, 3' opposite the rotation spindles (20 in FIG. 3) to have a V-shape profile with the point facing outwards. The corresponding wall of the base 2' has a corresponding profile, as shown in FIG. 10. This facilitates locating the clamp when closing it.

To provide a numerical example, without limiting the scope of the invention, the overall height of the elastic means is typically 6 cm, the width of the tongues 41, 42 is 1 cm and their thickness is 2 mm to 3 mm. The elastic material from which these tongues and the tongue 45 are made is preferably polyamide. The material of the retaining plates is preferably an elastomer material.

A second embodiment of the ski rack device of the invention will now be described with reference to FIGS. 11 through 14.

As shown more diagrammatically in FIG. 2, this embodiment essentially differs from the first embodiment in the disposition and, as will be made clear below, the specific configuration of the elastic means for holding the sporting articles to be transported: skis, surfboards or the like. The other components of this second embodiment of the device are similar to those already described. There is therefore no need to describe them in detail again.

FIG. 11 shows part of the device in section, showing the configuration of the main elastic means specific to this embodiment.

Firstly, note that the elastic means 7 are attached to the mobile clamp 3 and not to the base (not shown in this figure).

The elastic means 7 include an X-shape member. The upper two branches of the X-shape are attached to a horizontal plate 700 adapted to be fastened to the lower side of the clamp 3 (in the horizontal region 30). In the example shown the plate 700 can be force-fitted into and held in grooves 301 and 302 formed in the wall of the clamp 3. Of course, any other fixing means known to the person skilled in the art can be used instead. The lower branches 73 and 74 of the X-shape are downwardly open. The assembly is completed by two lateral branches 75 and 76 which are the shape of the letter "V" rotated 90° so that the points face outwards. In the example shown the branches of the V-shape re symmetrical to the horizontal axis $\Delta_H$ passing through the center of the X-shape. The branches of the X-shape and the lateral walls define a lozenge shape.

FIG. 12 is a schematic side view of the second embodiment of ski rack device. The clamp 3 has elastic means 7 and closes onto the base 2, as previously.

Although the elastic means 7 are in principle sufficient in themselves to hold the objects to be transported in place, it is nonetheless true that some categories of articles, such as surfboards, cause specific problems. Surfboards usually have protruding attachments. If two surfboards are transported, they must be disposed in a head to tail arrangement. It is also necessary to raise them relative to the roof of the carrying vehicle and therefore relative to the base 2. To this end the device of the invention is provided with auxiliary elastic means 8 fastened to the base. These elastic means 8 can be fixed.

In the embodiment shown in FIG. 12 they comprise a clamp 81 of a material with elastic properties held by a support 80.

When a single article such as a surfboard PS is inserted between the elastic means and the retaining plates, as shown in FIG. 13, only the lower branches 73 and 74 of the X-shape are raised to any meaningful extent (as shown by the arrows in the figure) and exert a holding pressure on said object. The lateral branches 75 and 76 stiffen the upper part of the X-shape and prevent it deforming under the conditions just described.

On the other hand, if objects with a greater overall thickness (for example a pair of skis $SK_1$ and $SK_2$) are inserted, as shown in FIG. 14, not only the lower branches but also the upper part of the X-shape deform. The lozenges defined by the upper branches 71 and 72 of the X-shape and the lateral stiffener walls are deformed in the manner of a pantograph. The arrows in FIG. 14 show the movements that occur. The vertical pressure exerted on the skis is naturally greater than in the previous case, since the force due to deformation (crushing) of said lozenges is added to the force due to flexing of the lower branches. When a first particular thickness of the objects to be transported is exceeded, the reaction (holding) force due to the deformation of the lozenges becomes the dominant force, the lower arms 73 and 74 of the X-shape being unable to deform further to any meaningful extent: at this stage they are substantially horizontal.

The elastic means 7 are preferably cut to length from an extruded material having elastic properties and the cross-section shown in FIG. 7 or any equivalent shape. By equivalent shape is meant a shape such that, upon crushing the elastic means 7, the latter exert vertical reaction forces in at least two separate ranges dependent on the cumulative thicknesses of the objects to be transported, which are also in two separate ranges.

To give a numerical example, without limiting the scope of the invention, the overall height of the cross-section of the elastic means 7 is in the order of 56 mm, its width at the bottom of the branches of the X-shape is 38 mm and its width at the level of the plate 700 is 30 mm. The weight of this kind of elastic member is typically 690 g per meter, the material of the elastic means 7 being advantageously an elastomer with good shape memory properties, such as the material known as EPM in this technical field. The retaining plates can be made from a similar material. On the other hand, the auxiliary elastic means 8, or at least the clamps 81, are preferably made from a more rigid material such as polyethylene.

Naturally, the invention is not limited to the embodiments specifically described with reference to FIGS. 1 through 14 in particular. For example, although it has been implied that the ski rack devices are autonomous, in the sense that they are adapted to be attached to roofrack bars or the like and can be demounted, and although this option is particularly beneficial since it enables the use of said roofrack bars for other purposes, the devices could form an integral part of roofrack bars used specifically for transporting skis, surfboards or similar articles. Also, the number of elastic means 4 per device is not limited to two. Each device could have a single elastic means or three or more, depending on the length of said device.

There is claimed:

1. Object holder device for transporting elongate objects of the type comprising a base having an elongate inside surface which is substantially plane and parallel to a first direction and at least one wall orthogonal thereto, a clamp and elastic means disposed between said clamp and said base, said clamp and said base being able to assume at least two different relative positions, one of which is an unlocked position allowing inserting into said device of at least one object to be transported and the other of which is a locked position in which said elastic means immobilize said objects to be transported by exerting a holding force on them, said elastic means having at least first and second specific positions for holding objects to be transported, to allow the transportation of objects whose cumulative thickness are in first and second ranges of thickness, at least one elastic means supported by said base and including a fixed part forming a guide fastened to said base and a mobile part including at least lateral members forming springs and guide means, said mobile part being inserted in said fixed part and said spring-forming lateral members allowing crushing by a specific amount of said mobile part in a direction substantially orthogonal to said first direction.

2. Device according to claim 1 wherein said fixed part has two facing walls perpendicular to said first direction and having a V-shape, the point of said V-shape pointing outwards, said walls being spaced apart to leave a free passage of particular width in said first direction, said mobile part includes a plate, a central tongue and curved lateral tongues constituting said spring-formed lateral members, said tongue having at their lower ends one of said guide members and being fastened at their upper end to said plate, the width of said tongue is less than the width of said free passage to allow insertion of said tongues between said vertical walls and said guide members have dimensions greater than said width and less than the distance between the inside surfaces of the facing walls so that they can slide along said walls and guide said mobile part, one of said lateral tongues exerts a holding force parallel to said first direction when at least one object to be transported is disposed between said tongue and said perpendicular wall of said base and a holding force orthogonal to said first direction when at least one object to be transported is disposed between said plate and said clamp.

3. Device according to claim 1 wherein at least said spring-forming lateral members of said elastic means are made from polyamide.

4. Device according to claim 1 further comprising further elastic means in the form of an elongate tongue fixed in its central part to the inside surface of said clamp, and wherein the ends of said tongue are curved towards the interior of the device to form springs.

5. Device according to claim 2 wherein an upper part of said plate and an inside surface of each wall of said base orthogonal to said first direction carry a retaining plate.

6. Device according to claim 5 wherein said retaining plate is made from an elastic material.

7. Device according to claim 2 wherein one of said lateral tongues is more curved than the other so that the positioning of said tongue facing a wall perpendicular to said base defines a housing for transportation of objects whose cumulative thicknesses are in a first range of thickness and so that the positioning of said second tongue facing said perpendicular wall of said base defines a housing for transporting objects whose cumulative thicknesses are in a second range of thicknesses.

8. Device according to claim 1 further comprising means for attaching it to a vehicle roofrack bar.

* * * * *